Dec. 27, 1938.     E. T. HENSLER ET AL     2,141,713
WATCH AND JEWELRY CLEANING MACHINE
Filed March 20, 1936
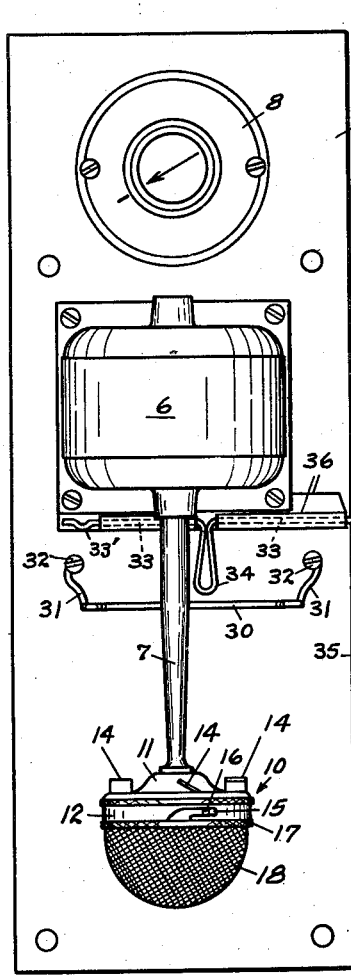
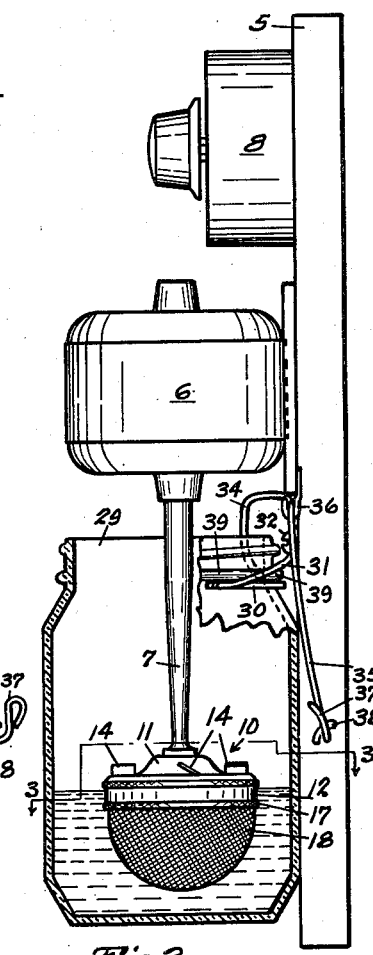
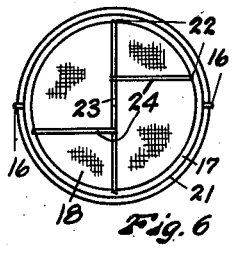
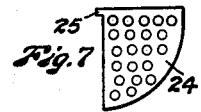
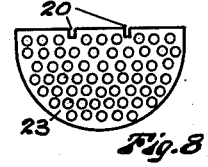
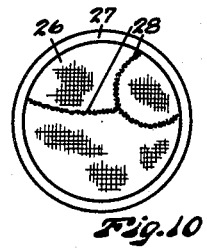
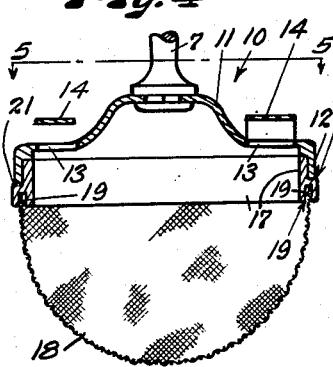
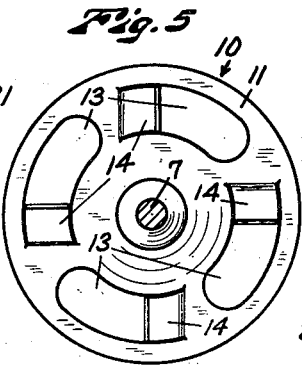
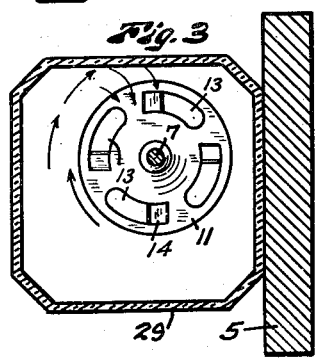
INVENTORS
Elmore T. Hensler
Herbert W. McKenzie
BY Fred C. Matheny
ATTORNEY Patented Dec. 27, 1938

2,141,713

UNITED STATES PATENT OFFICE 2,141,713

WATCH AND JEWELRY CLEANING MACHINE

Elmore T. Hensler and Herbert W. McKenzie, Seattle, Wash.

Application March 20, 1936, Serial No. 69,780

7 Claims. (Cl. 141—1)

Our invention relates to watch and jewelry cleaning machines and the primary object of our invention is to provide a watch and jewelry cleaning machine in which a rapidly rotating basket is positioned off center within a liquid container of non-circular cross sectional shape whereby great agitation of the liquid is produced by rotation of the basket in cooperation with the walls of the container and the liquid is caused to rise against a wall of the container and cascade or pour over the top of the basket and down through the basket thus producing a very thorough cleansing and washing of the articles in the basket.

Another object is to provide efficient means for producing a blast of air down through the basket for drying the watch parts or other articles after they have been washed.

Another object is to provide perforated or wire mesh basket means having removable partitions and trays by which compartments of different shape and size may be formed for the reception of different watch parts or jewelry articles.

Another object is to provide a machine of this nature having quickly releasable means for engaging with and holding a liquid receptacle in an operative, off-center, position as respects the rotating wire mesh basket containing the parts to be cleaned.

Other and more specific objects of the invention will be apparent from the following description taken in connection with the accompanying drawing.

In the drawing Fig. 1 is a front elevation of a watch and jewelry cleaning machine constructed in accordance with my invention, the liquid container for the cleaning solution being omitted.

Fig. 2 is a side elevation of said machine showing the liquid container in cross section in an operative position.

Fig. 3 is a cross section substantially on broken line 3—3 of Fig. 2 showing a liquid container of a preferred cross sectional shape and showing the off center position of the rotating basket as respects the liquid container.

Fig. 4 is a sectional view of the basket and basket cover on a larger scale than the preceding figures.

Fig. 5 is a plan view looking down onto the basket cover, the motor shaft being shown in cross section on line 5—5 of Fig. 4.

Fig. 6 is a detached plan view of the basket showing partitions therein.

Figs. 7 and 8 are detached views of partition members.

Fig. 9 is a sectional view of a tray member for use in the basket.

Fig. 10 is a plan view of the tray member shown in Fig. 9.

Like reference numerals designate like parts throughout the several views.

Referring to the drawing, 5 designates a mounting panel adapted to be fixedly secured in an upright position. 6 is a motor secured to the panel 5 with its axis of rotation substantially vertical. The motor 6 has a shaft 7 extending downwardly therefrom substantially parallel to the mounting panel 5 and in spaced relation from said panel. A combined rheostat and switch 8 is mounted on the mounting panel 5 above the motor 6 and connected with the motor 6 in such a manner that the motor 6 may be stopped or may be driven at various different speeds.

A basket top or cap member 10 is secured to the lower end portion of the shaft 7. This cap member 10 preferably has a bell shaped end portion 11 and a cylindrical flange portion 12. The end portion 11 is partially cut away to form openings 13 and an upwardly bent inclined vane portion 14 is formed at the end of each opening 13. A plurality of bayonet slots 15 are provided in the flange portion 12 for the reception of pins 16 on a ring 17 which is adapted to fit within the flange 12. A perforated or wire mesh basket 18, preferably of generally semi-spherical shape is secured to the ring 17. Preferably the ring 17 is provided with a groove 19 in the bottom edge, into which the top edge of the mesh basket 18 is inserted and soldered or otherwise fastened to secure said basket to said ring, see Fig. 4. Also the ring 17 preferably is provided with a shoulder 21 for engagement with the lower edge of the flange 12. The ring 17 is also preferably internally provided with vertical grooves 22 for the reception of a diametrical partition member 23 and other shorter partition members 24, Figs. 6, 7 and 8. The top edge of the diametrical partition member 23 is provided with notches 20 for the reception of lugs 25 on the upper end portions of the shorter partition members 24. The partition members are all preferably of perforated construction to allow a free circulation of liquid. By the construction just described I provide partitions which are readily insertable and readily removable, which are very firm and solid when in place, and one or more of which may be used to divide the basket either into two, three or four compartments.

Instead of the partitions, above described, I may provide a shallow wire mesh tray 26 of the form shown in Figs. 9 and 10. This tray 26 has a flange 27 at the top thereof adapted to rest on the top of the ring 17 and engage with the top of the cap member 10 when said tray is placed within the basket 18. Permanently anchored partition means 28 in the tray 26 may divide said tray into compartments of any desired shape.

Means for holding a liquid container or receptacle 29 are provided on the mounting panel 5 just below the motor 6. This holding means comprises a fixed, arcuately shaped holding member 30, preferably of strong resilient wire, having leg portions 31 secured to the mounting panel 5 by screws 32, together with a movable holding member comprising a substantially straight pivoted portion 33, a container engaging element 34 and a crank arm portion 35. The pivoted portion 33 is pivotally supported within a bearing member 36 which may be secured between the mounting panel 5 and the base of the motor 6. The container engaging element 34 is of hook like shape and is preferably provided by bending outwardly a part of the pivoted portion 33. The crank arm portion 35 extends downwardly along one side of the mounting panel and is provided at its lower end with a reversely bent part 37 forming a finger piece adapted to engage with a catch member 38 which is rigid with the mounting panel 5. The neck portion of the liquid receptacle 29 is provided with an external bead 39 for engagement with the fixed holding member 30. The hook like container engaging element 34 engages within the inside of the receptacle 29. The crank arm portion 35 is resilient and resiliently holds the hook like element 34 in firm engagement with the neck portion of the container. Preferably the portion 33 of the movable holding member has a bent or dis-aligned part 33' which resiliently presses against the bearing member 36 and acts as a spring means to yieldingly hold the hook like element 34 retracted when the arm 35 is disengaged from the catch 38, thus facilitating the securing of a receptacle 29 to the mounting panel 5. The holding member 30 and element 34 are both positioned to one side of the center of the motor shaft 7 so that the rotary basket 18 is disposed off center as respects the receptacle 29 and toward one corner of said receptacle 29, as shown in Fig. 3. The motor shaft 7 is spaced from the mounting panel 5 a suitable distance to position the basket 18 off center as respects the receptacle 29.

In operation of the device the articles to be cleaned are placed in the basket 18 and said basket is made fast to the cover member 10 by slipping the top ring 17 of the basket up within the flange 12 of the cover member with the pins 16 positioned in the slots 15 and the basket turned far enough so that the pins 16 support said basket. Cleaning solution is placed in the receptacle 29 and said receptacle is slipped up over the basket 18 and the upper end thereof engaged and held by the holding members 30 and 34. Current is then supplied to the motor 6 through the combined rheostat and switch 8 and the basket is rotated at any desired speed. The basket 18 is preferably submerged in the cleaning solution to substantially the level indicated in Fig. 2. When said basket is rotated rapidly it will produce a rotation of the cleaning solution in the receptacle 29. The rotation of this cleaning solution will tend to center around the basket 18. Due to the non-circular shape of the receptacle 29 and due to the positioning of the basket off center as respects said receptacle the rotating cleaning solution will be deflected by the receptacle wall adjacent the basket and will tend to pile up against said receptacle wall and will pour down directly into the top of the basket. This liquid passes down through the openings 13 and is assisted in its downward movement by the vanes 14, which help to drive said liquid downwardly through the basket and very quickly, efficiently and thoroughly clean the articles in the basket.

The quick and efficient cleaning action of this device is due to the use of a liquid receptacle of non-circular shape, to the provision, on the device, of means for supporting the liquid receptacle off center as respects the basket whereby the rotating cleaning solution will be caused to pile up against a wall of the receptacle and pour down onto the top of the basket and to the provision of the vanes 14 on the basket cover 10 which drive the solution down through the basket as said solution pours down onto the basket cover. The receptacle 29 is quickly and easily attached and detached so that the articles in the basket may be successively subjected to different cleaning solutions in a plurality of receptacles which are successively applied to the machine.

By removing the receptacle 29 and rotating the basket in the atmosphere, at high speed, the particles of cleaning solution which tend to adhere to the articles are thrown off by centrifugal force and air is forced down through the basket by the vanes 14 thus quickly and thoroughly drying the articles.

The foregoing description and accompanying drawing clearly disclose a preferred embodiment of our invention but it will be understood that this disclosure is merely illustrative and that such changes in the invention may be made as are fairly within the scope and spirit of the following claims.

We claim:

1. In a machine for cleaning watches and jewelry, a motor having a depending substantially vertical shaft rotatable on a relatively fixed axis; a perforated basket on the lower end portion of said motor shaft; a receptacle receiving said basket, said receptacle having a flat side wall; and means supporting said receptacle off center as respects said basket with the basket in relatively close proximity to said flat side wall.

2. In a machine for cleaning watches and jewelry, a motor having a depending substantially vertical shaft rotatable on a relatively fixed axis; a basket of perforated material secured to the lower end portion of said motor shaft; a liquid receptacle of substantially rectangular cross section positioned to receive said basket and means supporting said liquid receptacle with the basket off center as respects the vertical axis of the receptacle with the basket in relatively close proximity to a flat side wall of said rectangular receptacle.

3. In a machine for cleaning watches and jewelry, a normally upright mounting panel; a motor mounted on said mounting panel; a substantially vertical shaft connected with said motor and extending downwardly therefrom in substantially parallel relation to said panel and rotatable on a relatively fixed axis; a wire mesh basket on the lower end portion of said shaft; a liquid receptacle of substantially rectangular cross section open at one end and adapted to be passed upwardly over said basket; and readily releasable receptacle supporting means on the panel positioned to support said liquid receptacle in a position with the basket off center as respects the vertical axis of the receptacle with the basket in relatively close proximity to a flat side wall of said rectangular receptacle.

4. In a machine for cleaning watches and jewelry, a normally upright mounting panel; a motor mounted on said panel; a substantially vertical shaft connected with said motor and extending downwardly therefrom in substantially parallel relation to said panel and rotatable on a relatively fixed axis; a basket cover secured to the lower end portion of said shaft, said basket cover having openings therein; inclined vanes projecting over said openings positioned to direct fluid down through said openings when said basket cover is rotated in one direction; a perforated basket secured to said basket cover; a liquid receptacle of substantially rectangular shape open at one end adapted to be passed upwardly over said basket; and means supporting said liquid receptacle off-center as respects said basket with the basket in relatively close proximity to a flat side wall of said substantially rectangular receptacle whereby liquid in said receptacle set in motion by rotation of said basket will rise against the wall of said receptacle and descend on said basket cover.

5. In a machine for cleaning watches and jewelry, a normally upright mounting panel; a motor mounted on said panel having a relatively long substantially vertical shaft; a wire mesh basket on the lower end portion of said shaft; a relatively fixed arcuate receptacle supporting member secured to said panel adjacent the lower portion of said motor; a relatively movable manually operable hook shaped receptacle holding member positioned to cooperate with said relatively fixed receptacle supporting member; and a liquid receptacle of substantially rectangular cross section provided with a circular open top end portion having an external bead, said receptacle being insertable over said basket, said relatively fixed supporting member engaging said external bead positioning said receptacle off center as respects said basket and said movable hook shaped holding member engaging within the open end portion of said receptacle.

6. In a machine for cleaning watches and jewelry, a motor having a substantially vertical downwardly extending shaft; a basket cover secured to the lower end portion of said shaft, said basket cover having openings therein; inclined vanes on said basket cover extending over said openings positioned to direct fluid down through said openings when said basket cover is rotated in one direction; a readily removable basket of porous material engageable with said basket cover; and a receptacle receiving said basket and positioned off center as respects said basket and having a flat side wall positioned relatively close to said basket directing fluid onto said cover when said basket is projected into fluid in said receptacle and rotated.

7. In a machine for cleaning watches and jewelry, an upright mounting panel; a motor mounted on said panel, provided with a relatively long depending substantially vertical shaft; a basket cover secured to the lower end of said motor shaft, said basket cover having openings therein; a basket of porous material removably secured to said cover, inclined vanes on the top of said rotor adjacent said openings positioned to direct fluid downwardly through said openings in response to rotation of the basket cover in one direction; a receptacle of non-circular shape provided with flat sides; a relatively fixed receptacle holding member secured to said mounting panel below said motor and above said basket; a relatively movable manually operable receptacle holding member secured to said panel and cooperating with said fixed receptacle holding member for supporting said receptacle with the basket positioned within the receptacle and off center as respects the receptacle and with said basket in relatively close proximity to a flat side wall of said receptacle whereby rotating fluid within said receptacle will tend to pile up against said flat wall of said receptacle and pour down onto the top of said basket cover, the inclination of said vanes being in the correct direction to propel said downwardly pouring fluid through said basket.

ELMORE T. HENSLER.
HERBERT W. McKENZIE.